United States Patent [19]

Okamura et al.

[11] Patent Number: 5,476,730
[45] Date of Patent: Dec. 19, 1995

[54] AIR CELL

[75] Inventors: Okiyoshi Okamura; Masayuki Wakasa; Yoshihito Tamanoi, all of Kuga, Japan

[73] Assignee: KOA Oil Company, Limited, Tokyo, Japan

[21] Appl. No.: 655,365

[22] PCT Filed: Aug. 10, 1989

[86] PCT No.: PCT/JP89/00789

§ 371 Date: Feb. 12, 1991

§ 102(e) Date: Feb. 12, 1991

[87] PCT Pub. No.: WO90/01812

PCT Pub. Date: Feb. 22, 1990

[30] Foreign Application Priority Data

Aug. 12, 1988 [JP] Japan ................................. 63-201210
Aug. 12, 1988 [JP] Japan ................................. 63-201211

[51] Int. Cl.$^6$ ................................................ H01M 12/06
[52] U.S. Cl. ................................. 429/27; 429/34; 429/14
[58] Field of Search .......................... 429/27, 34, 101, 429/72, 14

[56] References Cited

U.S. PATENT DOCUMENTS

| | | | |
|---|---|---|---|
| 2,620,371 | 12/1952 | Bowditch . | |
| 3,709,735 | 1/1973 | Bonnemay et al. | 429/27 X |
| 3,915,748 | 10/1975 | Weidlich | 429/27 |
| 4,100,332 | 7/1978 | Carr | 429/27 |
| 4,145,482 | 3/1979 | Benda | 429/27 |
| 4,389,466 | 6/1983 | Joy | 429/27 |
| 4,400,447 | 8/1983 | Gerenser et al. | 429/27 |
| 4,528,249 | 7/1985 | Galbraith | 429/15 |
| 4,714,662 | 12/1987 | Bennett | 429/27 |
| 4,746,585 | 5/1988 | Stoner et al. | 429/27 X |

FOREIGN PATENT DOCUMENTS

| | | |
|---|---|---|
| 0298690 | 1/1989 | European Pat. Off. . |
| 2009063 | 9/1970 | Germany . |
| 39-30068 | 12/1939 | Japan . |
| 48-29256 | 9/1973 | Japan . |
| 49-128234 | 12/1974 | Japan . |
| 54-2330 | 1/1979 | Japan . |
| 54-27548 | 9/1979 | Japan . |
| 58-127566 | 8/1983 | Japan . |
| 58-225582 | 12/1983 | Japan . |
| 61-126777 | 6/1986 | Japan . |
| 1489576 | 10/1977 | United Kingdom . |

*Primary Examiner*—Anthony Skapars
*Attorney, Agent, or Firm*—Wenderoth, Lind & Ponack

[57] ABSTRACT

In an air cell a current collector is so disposed between a cathode and an anode that it is in contact with the cathode. The air cell can thus be compact and lightweight and yet is capable of generating a high power output under low internal resistance. Furthermore, the cathode has a plurality of spaced-apart sections or at least one through-hole to facilitate the release of hydrogen.

5 Claims, 5 Drawing Sheets

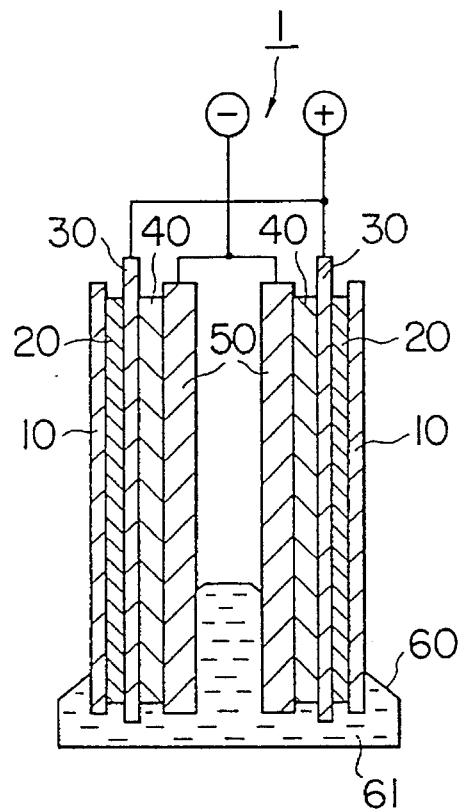
F I G. 1A
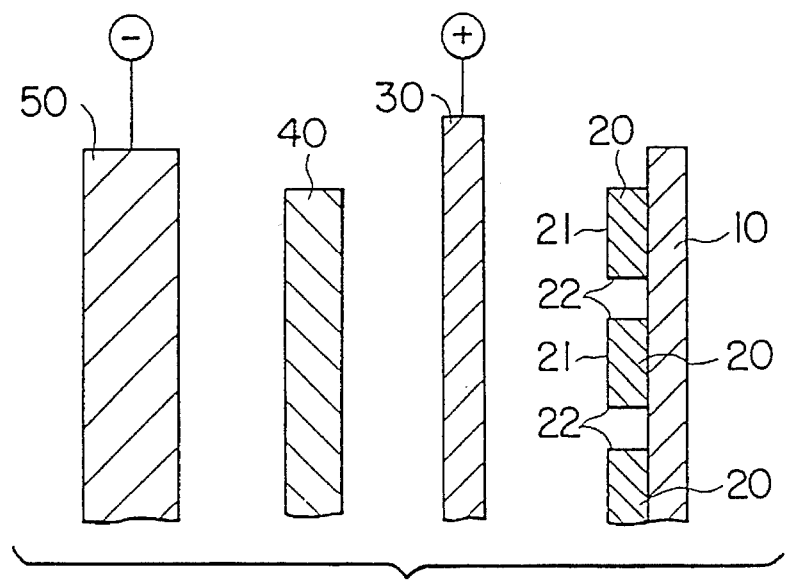
F I G. 1B

FIG. 3(d) COMPACTING BY ROLLER

AIR CELL

BACKGROUND OF THE INVENTION

The present invention relates to an air cell.

In order to drive a motor mounted on a model airplane, one or more cells to be mounted must be compact and light. Therefore, nickel-cadmium cells are generally used.

For instance, seven U No. 3 cells (about 170 g) mounted on a model helicopter can provide a flight time on the order of two minutes.

In order for such model airplanes to be put to such uses as cropdusting, surveying and photographing, there is a demand for lengthening the flight time. However, because the conventional cells have a small output per unit weight and many cells cannot be mounted on a model airplane, a sufficiently long flight time is difficult to achieve.

The conventional cells have a further problem not only in connection with model helicopters as mentioned above but also with driving power supplies which must supply high power, in that such cells cannot meet the demands for higher power per unit weight and a long service life.

SUMMARY OF THE INVENTION

An object of the present invention is to provide an air cell which is compact and light and yet is capable of supplying a high power output.

The air cell in accordance with the present invention is characterized in that a current collector is disposed between a cathode and an anode and contacts the cathode.

According to another aspect of the present invention, the cathode has a plurality of spaced-apart sections or at least one through-hole extending therethrough.

As described above, the current collector is disposed between the cathode and the anode and contacts the cathode. Accordingly, the air cell can be compact and lightweight, has a low degree of internal resistance, and advantageously generates high current.

Further, because the cathode has a plurality of spaced-apart sections or at least one through-hole extending therethrough, the air cell can be compact and light and yet is capable of producing a high output.

BRIEF DESCRIPTION OF THE DRAWINGS

FIG. 1A is a longitudinal sectional view of a first embodiment of the present invention;

FIG. 1B is an exploded view illustrating the component parts thereof;

BEST MODE FOR CARRYING OUT THE INVENTION

Figure 2:
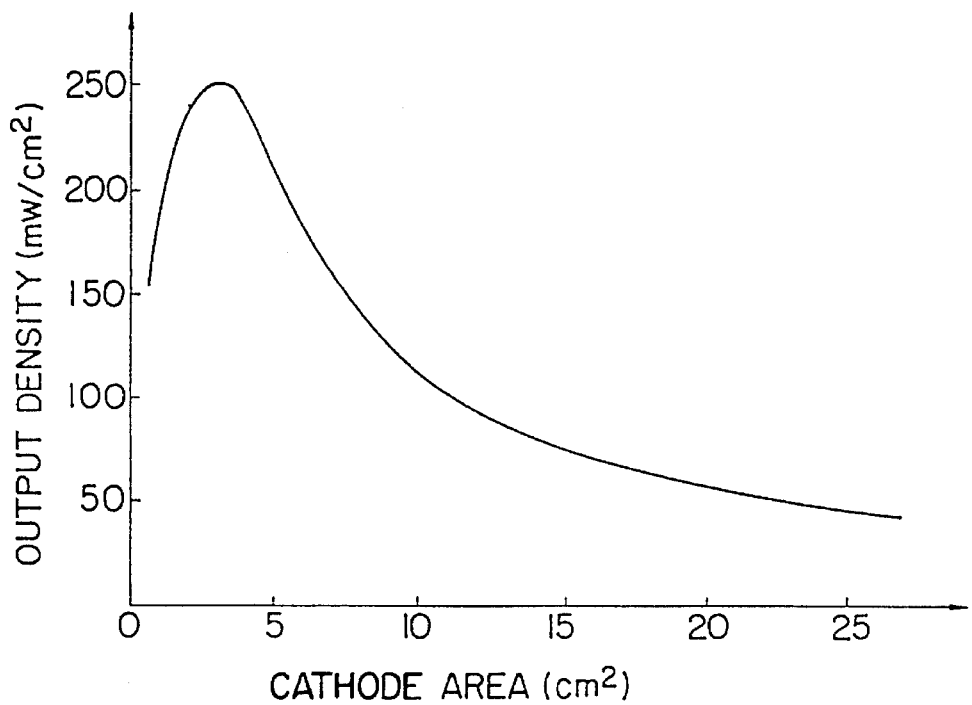
FIG. 2 is a graph indicating the relationship between cathode area and output density.

The air cell 1 of the first embodiment of the present invention has a porous glass sheet 10, a cathode 20, a current collector 30, a separator 40, an anode 50 and a liquid storage reservoir 60 storing therein liquid KCl 61.

The porous glass sheet 10 is a mounting plate for supporting the cathode 20 and is water repellent.

The cathode 20 is a film mainly consisting of petroleum graphite powder.

As shown in FIG. 1B, the cathode 20 is in intimate contact with the surface of the porous glass sheet 10 facing toward anode 50 and is divided into a plurality of sections.

The current collector 30 is in the form of a wire net or a screen which is fabricated from a metal such as nickel, copper or the like and has a mesh of from 200 to 300, so that moisture may pass through the current collector 30. It is disposed between the cathode 20 and the anode 50 and is in intimate contact with the cathode 20.

The separator 40 is made of a water absorbing material such as glass fiber sheet which has not been subjected to a water repellent treatment. It electrically isolates the current collector 30 from the anode 50 and absorbs liquid KCl or NaCl (electrolyte) 61 by a capillary phenomenon, so that the cathode 20 and the anode 50 are wetted. Instead of a glass fiber sheet, a sheet of paper can be used for the separator 40.

The anode 50 is made of a magnesium alloy, a zinc alloy, an aluminum alloy or the like. Only one alloy may be used to fabricate the anode 50, or the anode 50 may also be made of a plurality of alloys.

The following chemical reaction takes place at the cathode 20:

$$\tfrac{1}{2}O_2 + H_2O + 2e^- \to 2OH^-$$

or $$O_2 + H_2O + 2e^- \to O_2H^- + OH^-\ \ O_2H^- \to OH^- + \tfrac{1}{2}O_2$$

On the other hand, when the anode 50 is made of a Mg alloy, the following chemical reactions occur:

$$Mg + 2OH^- \to MgO + H_2O + 2e^-\ \ Mg + 2H_2O \to Mg(OH)_2 + H_2\uparrow (\text{side reaction})$$

The above-described chemical reactions are similar to those occurring in conventional cells. When a load is connected to the air cell 1, the electrons $e^-$ produced in the anode 50 flow through the load and reach the cathode 20 at which the electrons $e^-$ are consumed as described above. In this way, the current flows from the cathode 20 to the anode 50.

In the first embodiment, the cathode 20 is divided into a plurality of cathode sections so that the cathode 20 has flat surface portions 21 and edges 22 which are in contact with the current collector 30. The cathode sections having edges 22 are spaced apart from each other.

If the quantity of transmitted gas is represented by Q, the coefficient of gas transmission by P, the gas pressure difference by P, the cross-sectional area of the cathode 20 by A', the film pressure of the cathode 20 by l, and the temperature by t, the following equation (I) holds true:

$$Q = P \times (\Delta P/l) \times t \times A \tag{I}$$

If the gas diffusion coefficient is represented by D, and the solubility by S, the following equation also holds true:

$$P = D \times S \tag{II}$$

In the first embodiment, the diffusion coefficient at the edges 22 is greater than that at the flat surface portions 21 of the cathode 20. It thus follows from Eq. (II) that the gas transmission coefficient P is high at the edges 22 at which the gas diffusion coefficient D is high. Therefore, from Eq. (I), it is seen that the gas transmission quantity at the edges 22 is greater than that at the flat surface portions. The fact that the gas transmission quantity at each projection 22 is large means that the quantity of the oxygen transmission at each edge 22 is large.

In view of the above, when the cathode 20 consists of a plurality divided sections instead of a single sheet, the quantity of the transmitted oxygen is comparatively large. As a result, the reaction at the cathode which contributes to the power generation is accelerated, so that the generated power is increased.

Alternatively, then, the cathode 20 can be in the form of a single flat sheet with at least one aperture or through-hole extending therethrough so that the generated power per unit weight is comparatively high as described above.

In the first embodiment, the current collector 30 is in intimate contact with the surface of the cathode 20 that faces anode 50, so that the electrons generated in the anode 50 need not pass through the cathode 20. As a result, an internal voltage drop in the air cell 1 is inhibited. In the case of a conventional air cell, anodes are disposed at the center portion of the cell, cathodes are disposed radially outwardly of the anodes, and a wire net made of a metal such as nickel is disposed outwardly of the cathodes and is used as a current collector. In this case, the above-described reactions occur at the cathode side of the anode, or the inner surface of the anode, so that when the electrons flow from the current collectors to the cathodes and further flow through the cathodes, they encounter an electric resistance on the order of 0.1 Ω. When a high current on the order of 10 A flows, the voltage drop becomes 1 V.

However, according to the present invention, the current collector 30 is placed in intimate contact with the surface of the cathode 20 that faces toward anode 50, so that the current collector 30 is located where the above-mentioned reactions occur. Consequently, the electrons generated at the anode 50 can flow directly to the reaction portion without passing through the cathode 20. Therefore, the internal voltage drop resulting from the passage of electrons through the cathode is inhibited. The above-described constructions is especially advantageous in producing a high current.

FIG. 2 illustrates the variation of the output density with variation of the area of the cathode 20.

The measurement conditions are that the electrolyte is 20% KCl, the film pressure is 180 micrometers, and the temperature is 24° C. It is apparent from FIG. 2 that the output power per unit area when the cathode 20 has a small surface area is greater than the output power per unit area when the cathode 20 has a large surface area. When the cathode 20 has a surface area on the order of 3 cm², the maximum power output per unit area can be obtained.

FIGS. 3(a)–3(f) illustrate the fabrication of the plurality of sections of the cathode 20.

First, the above-mentioned petroleum graphite powder and active carbon are mixed in a ratio of about 6:4, and then a poly-tetrafluoroethylene dispersion liquid is added and mixed. This mixture is a basic material of the cathode 20. It should be noted here that active carbon is used as a catalyst.

Next, the porous glass sheet 10 on which the cathode 20 is mounted is subjected to a water-repellent treatment. Then a mold 60 is mounted on the porous glass sheet 10. Thereafter the basic material of the cathode 20 is cast in the mold 60, and the upper surface of the cast basic material is compressed by a roller.

Next, the excess basic material of the cathode 20 which is squeezed out of the mold 60 is removed by a scraper, and then the mold 60 is removed. Thereafter, the cast basic material of the cathode 20 is heated to a temperature on the order of about 380° C. A plurality of sections of the cathode 20 thus baked are joined to the porous glass sheet 10.

When the mold 60 has a plurality of square openings, the cathode 20 takes the form of stripes, so that a high-output air cell can be obtained. Moreover, the mold 60 may be formed with a plurality of openings of a shape other than square such as triangular, pentagonal or round.

Figure 4:
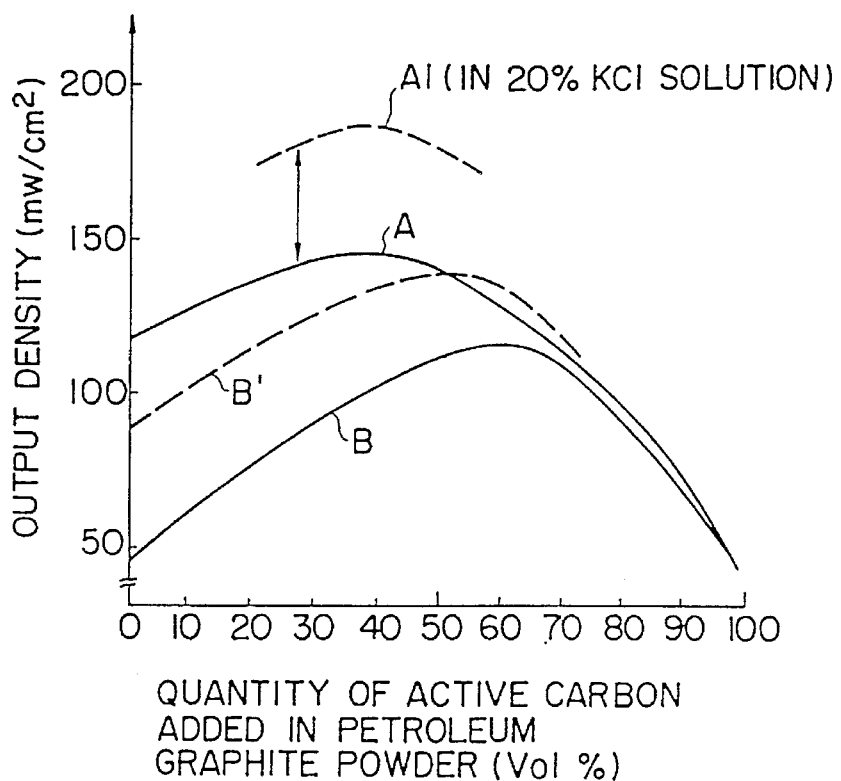
FIG. 4 is a graph indicating the relationship between the quantity of active carbon contained in a petroleum-series graphite powder and the output density.
Figure 3A:
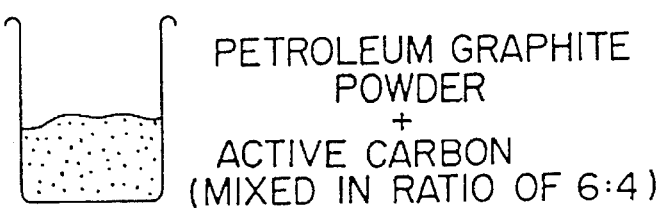
FIG. 3 illustrates the steps for the fabrication of a cathode 20 in the first embodiment.
Figure 3B:
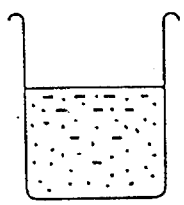
Figure 3C:
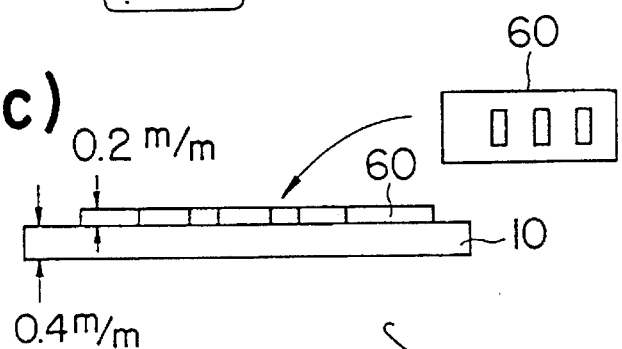
Figure 3C:
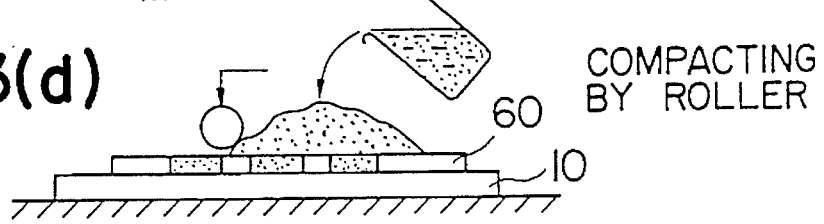
Figure 3E:
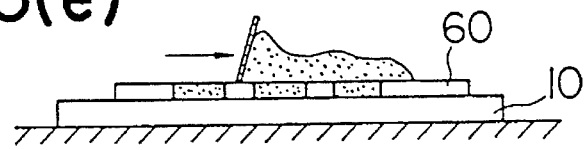
Figure 3F:
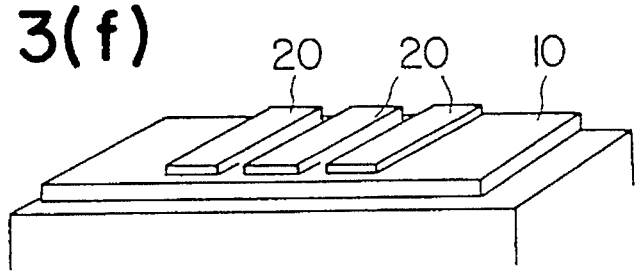

FIG. 4 indicates the variation of the output density (output power per unit area) with variation in the quantity of the active carbon in the petroleum graphite.

The test conditions producing the results shown in FIG. 4 are a temperature of 34° C., size of the cathode 20 of 5 cm ×1 cm ×180 microns, quantity of the polytetrafluoroethylene which is diluted four times of four drops (0.2 cc), quantity of water of four drops (0.2 cc), and electrolyte solution (5% NaCl).

The characteristic curve A in FIG. 4 is obtained when petroleum graphite powder A is used. The characteristic curve B is obtained when petroleum graphite powder B is used. The curve B' is obtained when petroleum graphite powder B is subjected to a treatment with a catalyst. The curve Al is obtained when petroleum graphite powder A is tested within 20% KCl.

As shown in FIG. 4, when the quantity of active carbon is between 30 and 70%, the output power per unit area becomes high. The quantity of active carbon is preferably between 30 and 50% and, more preferably, between 35 and 45%.

The use of the air cell as an emergency power supply used when the battery of an automotive vehicle fails, as a power supply for a model, or as a power supply for recreational equipment such as camping or fishing equipment, is very advantageous because the air cell is compact, lightweight and is capable of generating a high power output. Normally, the cathode 20 and the anode 50 are not placed in contact with the electrolyte such as KCl. Only when the air cell is actually used are they placed in contact with the electrolyte. Prior to such actual use of the air cell, a power drop due to natural discharge or the like will not occur. Thus, a long shelf life can be ensured so that the air cell may be used as a power supply in the case of an emergency.

So far the electrolyte has been described as KCl, but it is to be understood that sea water, a solution of salt or the like may be used as well.

Instead of the cathode 20 being divided into a plurality of sections as shown in FIG. 1B, the cathode may be in the form of a sheet or plate formed with many pores (through-holes).

Figure 5A:
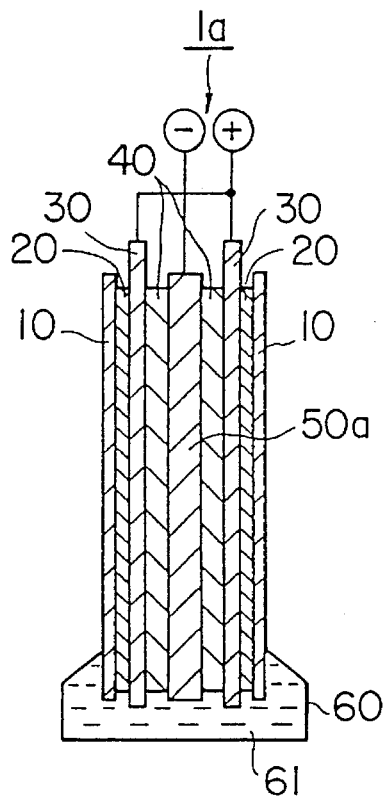
FIG. 5A is a longitudinal sectional view of a second embodiment of the present invention.
Figure 5B:
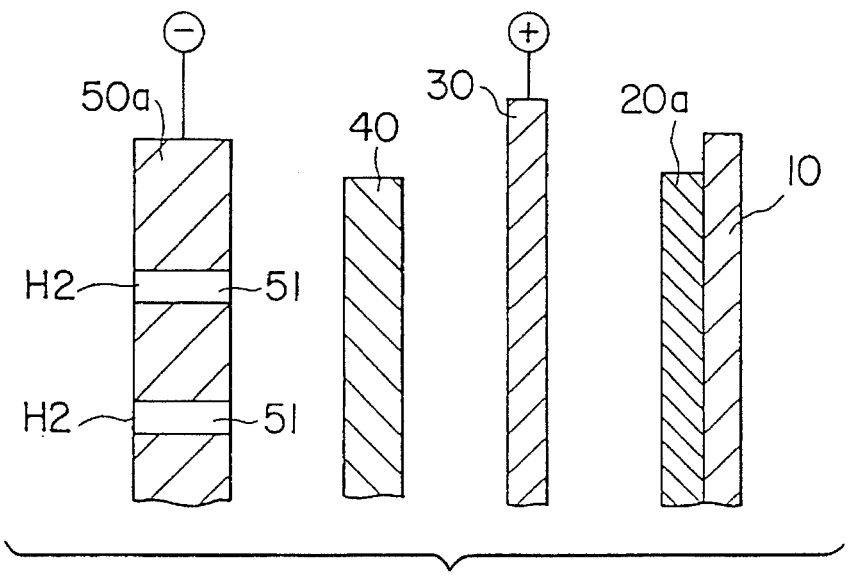
FIG. 5B is an exploded view illustrating the component parts thereof.

FIG. 5A illustrates second embodiment of the present invention. FIG. 5B is an exploded view thereof.

The same reference numerals in FIGS. 1A and 1B are used to designate similar parts in the figures.

In the air cell 1a shown in FIG. 5A, the cathode 20a is in the form of a single flat plate, and the anode 50a is formed with a plurality of through-holes 51. Furthermore, only one anode 50a is used.

As described above, the anode 50a is formed with a plurality of through-holes 51, so that the hydrogen which is produced in the course of the auxiliary reaction when the power is generated can easily separate from the anode 50a. Therefore, the reaction speed is high, whereby the generated power is correspondingly high. Furthermore, because only one anode 50a is used, the air cell 1a is light.

Furthermore, the anode 50a may take the form of a comb with the through-holes 51 being comparatively large.

Figure 6:
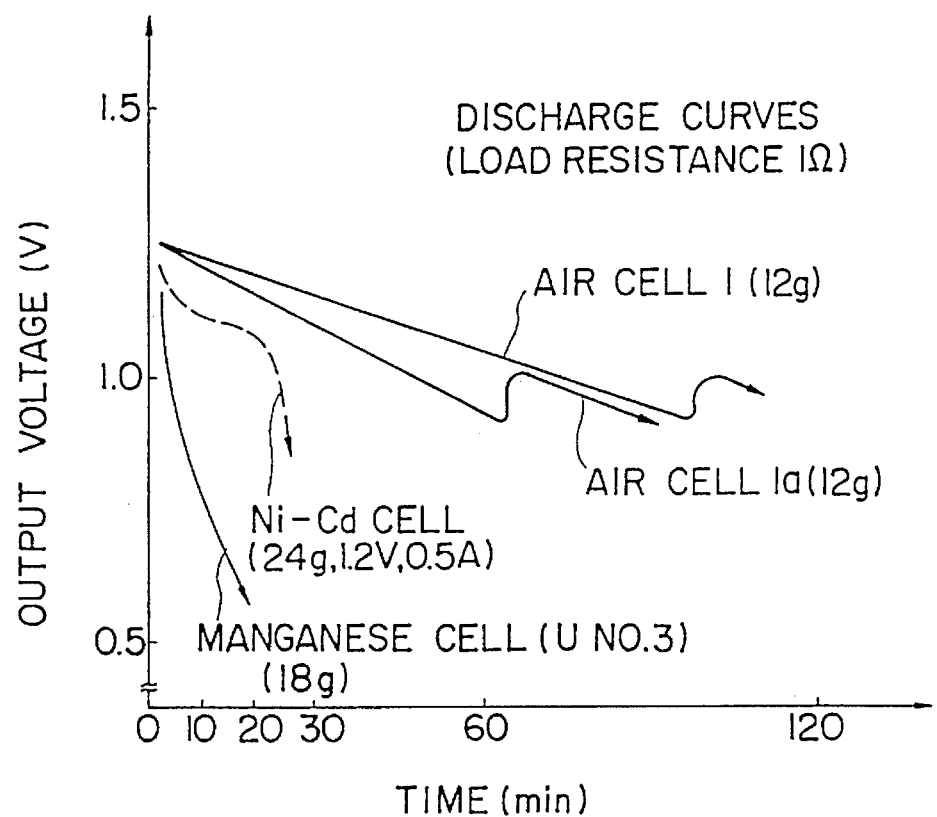
FIG. 6 is a graph showing discharge curves.

FIG. 6 shows the discharge curves of the first and second embodiments of the present invention and of conventional cells.

In this case, the load resistance is one ohm, and the voltage when the measurements are started is about 1.2 V. It follows, therefore, that when the output voltage is 1 V, the output current is 1 A.

It is seen from FIG. 6 that in the case of a manganese cell, the output voltage drops below 1 V within a few minutes after the test is started, and in the case of a Ni-Cd cell, the output voltage drops below 1 V within a little over 20 minutes. On the other hand, in the case of the air cell 1 shown in FIG. 1A, even though the total weight thereof is only 12 g, the output voltage drops below 1 V after only 70 minutes. The air cell 50a shown in FIG. 5A drops below 1 V only after 50 minutes even though the total weight of the air cell 1a is only 12 g.

Figure 7:
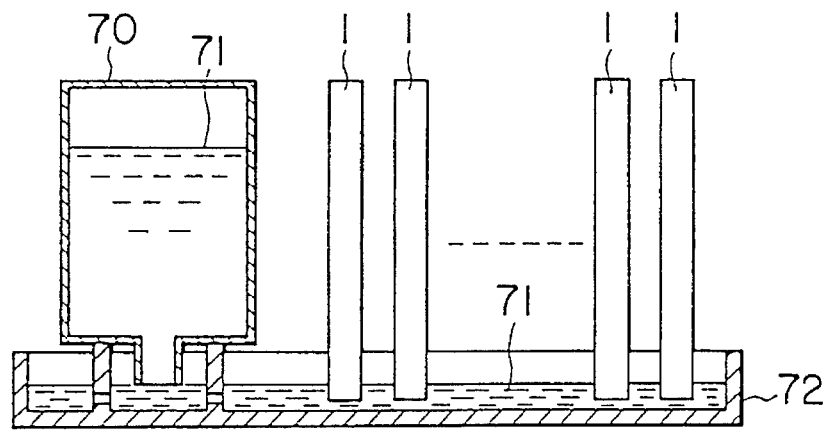
FIG. 7 is a sectional elevation view of a third embodiment of the invention.

FIG. 7 illustrates the third embodiment of the present invention in which an electrolyte is supplied to a plurality of air cells 1. A plurality of air cells 1 are disposed in a vessel 72, and a tank 70 for storing liquid KCl 71 is disposed upside down. It therefore follows that as long as the KCl liquid 71 is stored in the tank 70, it is always supplied to the air cells 1, so that the service life of the air cells is increased. In this third embodiment, more than two tanks 70 can be used, and the air cells 1 may be connected in series or in parallel.

As described above, even though the third embodiment is very light, it can generate a high output for a long time. Furthermore, the magnesium used in the above-described examples is contained in sea water and is harmless, and the air cell does not contain any toxic substance such as cadmium used in Ni-Cd cells.

Referring back to FIG. 6, the voltages of the air cells 1 and 1a are gradually decreased and then increased at some time point. This phenomenon occurs because the liquid KCl 61 is continuously supplied. The liquid KCl 61 evaporates when the air cell is used, but when the liquid KCl 61 is replenished, the voltage can be recovered to some extent.

When a plurality of cathodes 20 are fabricated, it is advantageous to carry out the steps shown in FIG. 3 because the fabrication process is simple. Furthermore, the characteristics of the air cell can be stabilized as shown in FIG. 6. The materials used are inexpensive, so that the manufacturing cost of the air cells is low. Moreover, when the fabrication process shown in FIG. 3 is used, variations in the quality of the cathodes 20 can be decreased to a minimum.

So far petroleum graphite powder has been described as being used to fabricate the cathode. However, even when the cathode sections are of a graphite other than petroleum graphite powder, the generated power per unit weight is high. Furthermore, even when the cathode is of a graphite other than petroleum graphite powder, the generated power per unit weight can be made high by disposing current collectors between the cathodes and the anodes.

We claim:

1. An air cell comprising a cathode; an anode having a comb-like shape so that a plurality of openings are defined therethrough; and means for collecting electrons generated at said anode, said means comprising a current collector and contacting said cathode at a surface thereof facing toward said anode.

2. An air cell as set forth in claim 1, and further comprising a separator interposed between said cathode and said anode and a reservoir of liquid into which said separator extends,. Said anode and said cathode being wetted by said liquid via said separator.

3. An air cell as set forth in claim 1, and further comprising a liquid storage means for continuously supplying an electrolyte to said cathode and said anode.

4. An air cell comprising an anode; a cathode having a plurality of spaced-apart sections or at least one through-hole extending therethrough; and a porous water-repellent body to which said cathode is mounted.

5. An air cell as set forth in claim 1, and further comprising a porous water-repellent body to which said cathode is mounted.

* * * * *

UNITED STATES PATENT AND TRADEMARK OFFICE
CERTIFICATE OF CORRECTION

PATENT NO. : 5,476,730
DATED : December 19, 1995
INVENTOR(S) : Okiyoshi OKAMURA et al.

It is certified that error appears in the above-indentified patent and that said Letters Patent is hereby corrected as shown below:

On the Title page, Section [22] PCT Filed: Change "Aug. 10, 1989" to --Aug. 1, 1989--.

Signed and Sealed this

Eighteenth Day of February, 1997

Attest:

BRUCE LEHMAN

Attesting Officer     Commissioner of Patents and Trademarks